Sept. 4, 1951 L. V. FRANCE 2,566,829
PROPOLIS CULTURE
Original Filed April 27, 1946 2 Sheets-Sheet 1
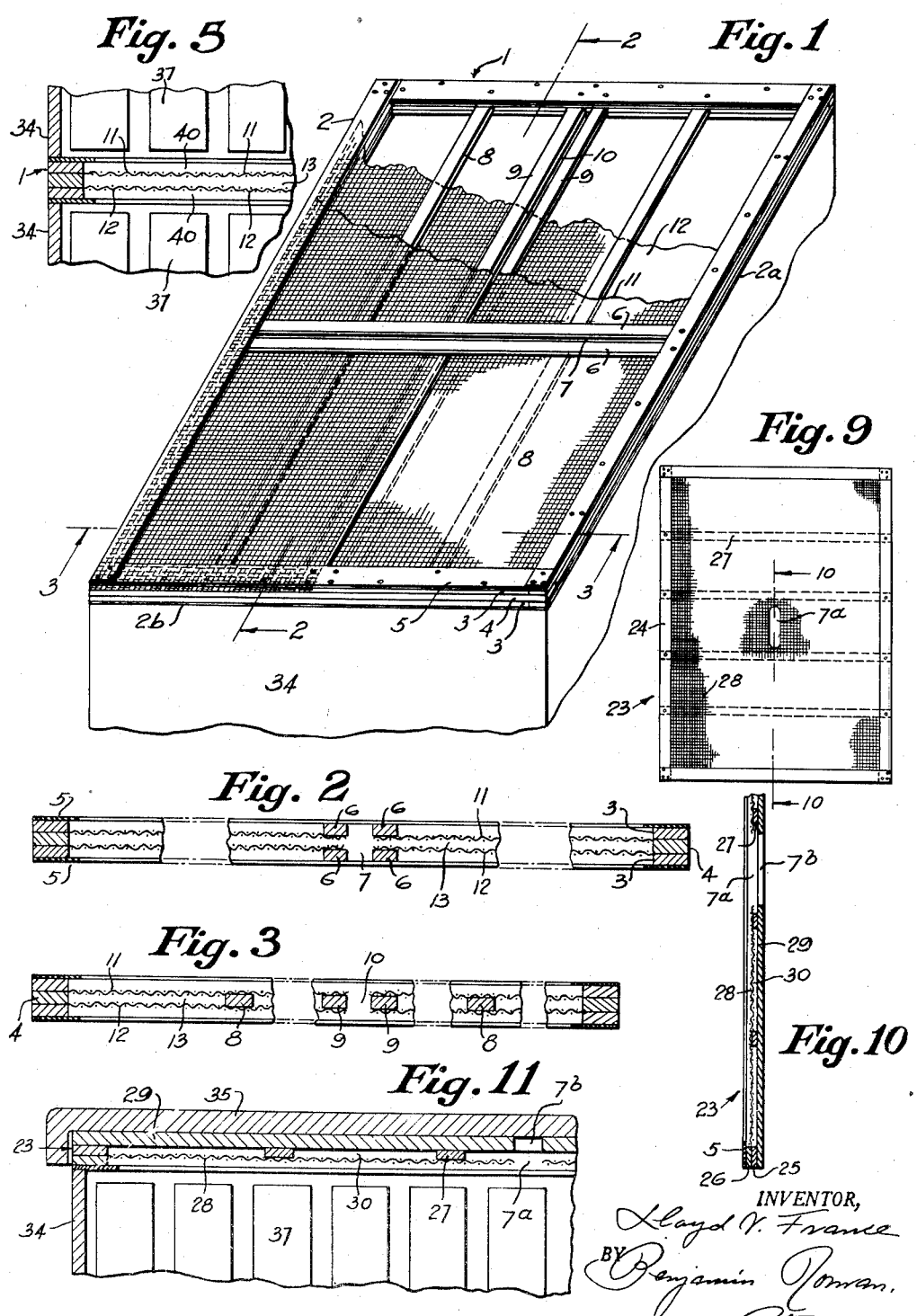
INVENTOR,
Lloyd V. France
BY Benjamin Tomson
Atty.

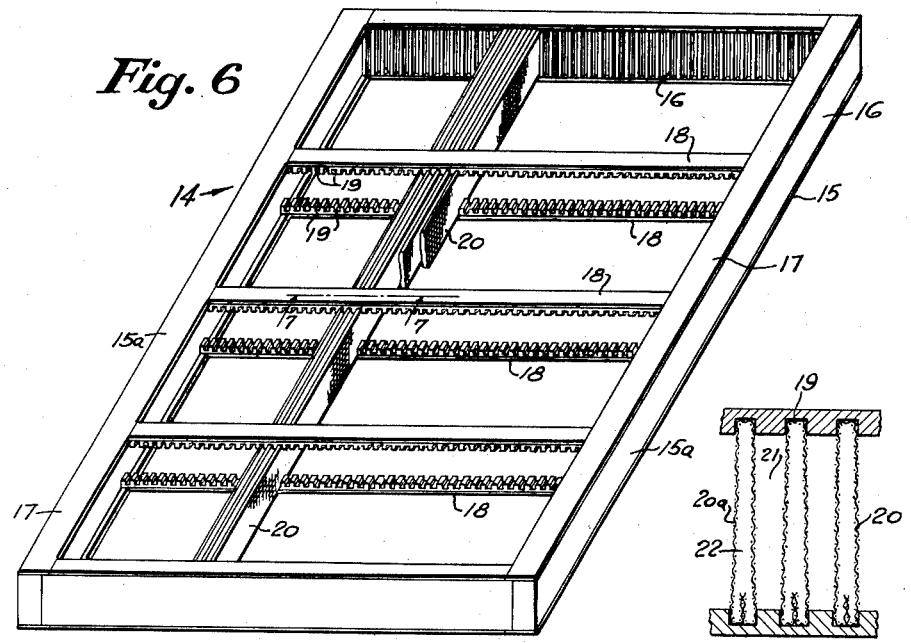
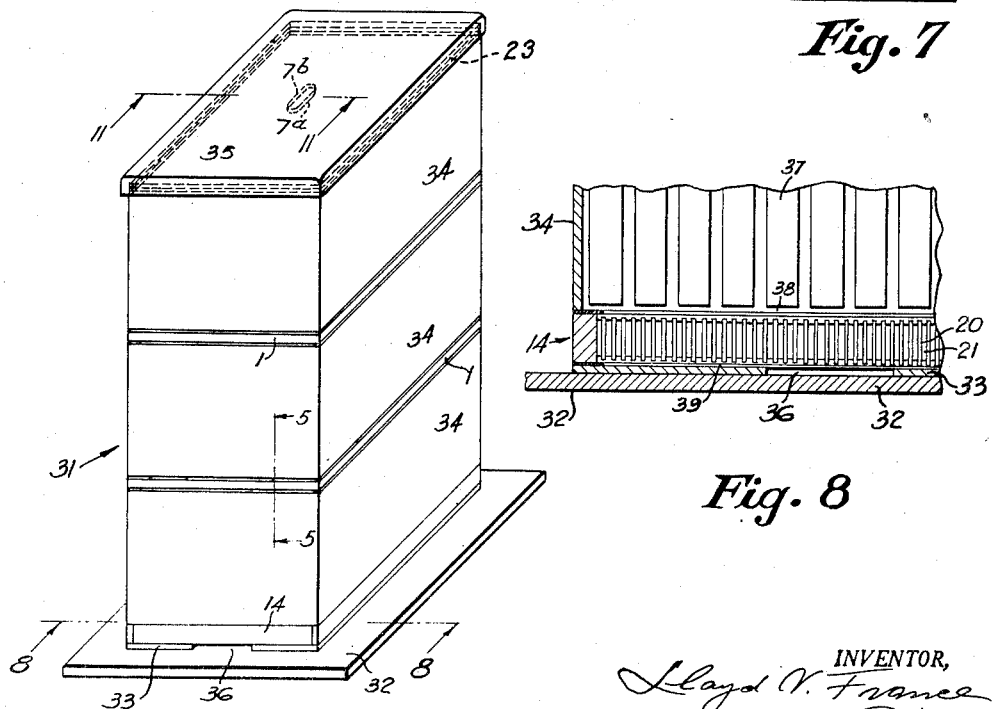

Patented Sept. 4, 1951

2,566,829

UNITED STATES PATENT OFFICE 2,566,829

PROPOLIS CULTURE

Lloyd V. France, Platteville, Wis.

Original application April 27, 1946, Serial No. 665,410. Divided and this application April 15, 1950, Serial No. 156,126

6 Claims. (Cl. 6—12)

1

This invention relates to bee culture, and particularly to derivation of propolis from bee hives. Propolis, commonly known as bee glue, is a resinous material collected by bees from trees and plants, and is by them brought to the hive wherein they utilize it for sealing cracks and other purposes useful to their operations. As the bees bring this material in far greater quantities than needed for their useful purpose, it is found scattered all over the hive, wherein it produces cementation and damage to its severable parts, uncleanliness, misspent labor, and other annoyances to the bee keeper. Propolis is however highly useful for medicinal and many industrial purposes, and it would be much more valuable to society if it were obtainable in sufficiently large amounts, which is not possible now-a-days owing to absence of means, devices, and facilities for its production, in gathering, and accumulation.

The principal object of the invention is to obtain propolis in large quantities through the operation of bee hives, the sale of which material will be in turn profitable to the apiarist.

Another object is to equip a bee hive with devices and appurtenances, which will induce the bees to deposit all their surplus propolis thereinto and accumulate it for collection by the apiarist, and will incidentally remedy all the above mentioned disadvantages presently existing in hives.

A further object is to provide a bee hive with the aforesaid equipments, which will be conveniently and economically manufacturable, saleable at low cost, and conveniently utilizable.

This is a divisional application of my patent application filed April 27, 1946, Serial No. 665,410, now Patent No. 2,517,419, issued August 1, 1950.

In the accompanying drawings—

Fig. 1 is a perspective view showing a device utilized in connection with this invention.

Fig. 2 is a longitudinal cross-section elevational view of the device shown in Fig. 1, taken on line 2—2 of Fig. 1. Fig. 3 is a transverse-sectional similar view, taken on line 3—3 in Fig. 1.

Fig. 4 is a perspective view of a bee hive equipped with the devices utilized in connection with the invention.

Fig. 5 is a fragmentary cross-sectional elevational view of the bee hive shown in Fig. 4, taken on line 5—5 in Fig. 4.

Fig. 6 is a perspective view showing a modified device utilized in connection with the invention.

Fig. 7 is a fragmentary transverse cross-sectional elevational view, on an enlarged scale, of the device shown in Fig. 6, taken on line 7—7 of Fig. 6.

Fig. 8 is a fragmentary cross-sectional elevational view of the bee hive shown in Fig. 4, in an larged scale, taken on line 8—8 in Fig. 4, and illustrating the hive as equipped with the device shown in Fig. 6.

Fig. 9 is a bottom plan view of another modified

2 device as utilized in connection with this invention.

Fig. 10 is a longitudinal cross-sectional elevational view, in an enlarged scale, of the device shown in Fig. 9, taken on line 10—10 in Fig. 9.

Fig. 11 is a fragmentary cross-sectional elevational view of the bee hive shown in Fig. 4, and illustrates the hive as equipped with the device shown in Figs. 9, 10, this view being in an enlarged scale and taken on line 11—11 in Fig. 4.

The device 1, Fig. 1, comprises a sash frame 2 having a length and width corresponding to those of a hive body, and said frames are made of wooden mouldings 3, 4 and metallic face mouldings 5. The longer sides 2a of frame 2 are securely joined by transverse moulding 6, which are separated from each other to provide a bee passageway 7, and the shorter sides 2b are similarly joined by longitudinally disposed mouldings 8—8, 9—9, the latter being separated by a space 10, providing an ample bee passageway. Between the mouldings 3, 6, 9 are mounted metallic cloth screens 11, 12, constituting foraminous sheets that are separated from each other by the mouldings 4, 8, 9 to provide an intervening space 13 therebetween, which is substantially less than that of a bee passageway, as illustrated in Figs. 2, 3.

The device 14, shown in Fig. 6, comprises a sash frame 15 of overall dimensions similar to those of device 1, Fig. 1, and made of wooden mouldings 16 faced with metallic mouldings 17. The longer sides 15a of frame 15 are securely joined by a plurality of pairs of registering rack-like mouldings 18, in the registering notches 19 of which, Fig. 7, are mounted collapsed tubular laths 20 made of metallic screen cloth constituting a foraminous sheeting. Said laths extend throughout the entire area of the frame 15, but only a limited number thereof is shown in Fig. 6 for clearness and convenience of illustration. The laths 20 are separated from each other by distances providing spaces 21 therebetween of ample bee passageways, while the space 22 within each lath 20 between its screen-walls 20a is of a width substantially less than that of a bee passageway. The spaces 21 are preferably made to taper downwardly as shown.

The device 23, Figs. 9, 10, comprises a sash frame 24 of similar dimensions to those of devices 1, 14, and made of mouldings 25, 26 joined by transverse mouldings 27. Throughout the frame 24 there is mounted a cloth screen 28 constituting a foraminous sheet, and said frame is secured or maintained adjacent to a wall 29, thereby providing a space 30 between said wall and the screen 28 which is substantially less than a bee passageway, the mouldings 25, 27 serving to maintain this requisite spacing. The screen 28 is preferably provided with a bee passageway 7a, and the wall 29 with a registering passageway 7b, to provide a bee passage for bee escape, or other purposes well known to the apiarist.

In equipping a usual bee hive 31, Fig. 4, with this invention, the hive comprising a bottom board 32, a rim 33 thereupon, hive bodies 34, and outer cover 35, resort may be had to any one or more of the above described modified devices 1, 14, 23. Thus, the device 14 may be laid upon the rim 33 and underlying the lowermost hive body 34, a device 1 may be interposed between each pair of adjoining hive bodies, and a device 23 may be placed upon the topmost hive body 34 and underneath the outer cover 35.

It is found to be in the nature of the worker bees to continually inspect the entire hive on lookout for any crevices, cracks, or openings, and to thereupon fill and clog up the same with propolis for complete sealing, apparently to avoid drafts and preserve the temperature of the interior. Also, if they encounter any passageway space which is less than .160 inch in height the worker bees will not attempt to enter it, but will proceed to fill up with propolis such spaces, apparently unusable to them, and it is these instincts of the bees which are resorted to in the concept, execution, and carrying out of this invention.

In operation—the bees coming through entrance 36 of the hive 31, Fig. 4, and through hive bodies 34, pass through the passageway spaces 31 of device 14, Figs. 8, 7, 6, as well as through the channels 7, 10 of devices 1, Figs. 5, 1, and encounter the screen 28 of device 23, Figs. 10, 9. Between the tops of laths 20 of device 14 and bottoms of comb-frames 37 of hive body 34, Fig. 8, there is a wide bee space 38, and there is a similar space 39 between the bottoms of laths 20 and the bottom board 32. As the bees pass around the laths 20 and through the intervening spaces 21, they encounter the screen walls 20a, and thereupon proceed to deposit propolis into the spaces 22 of the laths, reaching thereinto through the mesh openings of the screen cloth, with the aim of completely filling up said spaces and sealing up the mesh openings.

Between the screens 11, 12 of device 1, Fig. 5, and adjoining comb-frames 37 there are wide bee spaces 40, and in a similar manner, therefore, the worker bees proceed to deposit propolis into the spaces 13 between said screens and ultimately sealing up their mesh openings. On the bees encountering the screen 28 of device 23, Figs. 11, 10, 9, they likewise deposit propolis into the spaces 30 of said device intervening between said screen and the wall 29, which as here shown serves also as the inner cover for the hive 31.

In due course, all the devices 23, 1, 14, become fully filled up and clogged with accumulations of propolis, whereupon they may be taken out of the hive, the propolis completely removed therefrom, and the cleared and cleaned devices may be thereafter reassembled into the hive for repetition of their functions. The metallic face mouldings 5, Fig. 2, of devices 1, 23 and 17 of device 14, Fig. 6, aid in the separation of the propolis-cemented devices from the hive bodies, and the tapering forms of spaces 21, Fig. 7, are conducive to the clear falling through of any waste matter coming downwardly from the hive.

The removal and clearing of the accumulated propolis from the devices 14, 1, 23 may be performed by various suitable methods and means that are well known for purposes of removal of resinous materials in dry state from surfaces, as by application of heat or solvents to the screens 11, 12 of device 1, the slats 20 of device 6, or screen 28 of device 23.

Variations may be resorted to within the scope of the invention, and portions of the improvements may be used without others.

Having thus described my invention, I claim:

1. In combination with a bee hive, a device for propolis obtention mountable within the hive comprising a foraminous sheet, a framing for retention of said sheet and its placement in superposition over a wall in the hive and in separation from said wall by a distance of less than a bee space, for inducing the bees to fill said space with propolis, and said device being removable from the hive for clearing it of its accumulated propolis.

2. In combination with a bee hive, a device for propolis obtention mountable within the hive comprising a foraminous sheet, means for retention of said sheet in superposition over a wall in the hive and in separation from said wall by a distance of less than a bee space, for inducing the bees to fill said space with propolis, and said device being removable from the hive for clearing it of its accumulated propolis.

3. In combination with a bee hive, a device for propolis obtention mountable within the hive comprising a foraminous sheet, a framing for retention of said sheet and its placement in superposition over a wall in the hive and in separation from said wall by a distance of less than a bee space, for inducing the bees to fill said space with propolis, said sheet having a channel to permit bee passage therethrough, and said device being removable from the hive for clearing it of its accumulated propolis.

4. In combination with a bee hive, a device for propolis obtention mountable within the hive comprising a foraminous sheet, means for retention of said sheet in superposition over a wall in the hive and in separation from said wall by a distance of less than a bee space, for inducing the bees to fill said space with propolis, said sheet having a channel to permit bee passage therethrough, and said device being removable from the hive for clearing it of its accumulated propolis.

5. In combination with a bee hive, a device for propolis obtention mountable within the hive comprising a foraminous sheet, a framing for retention of said sheet and its placement in superposition over a wall in the hive and in separation from said wall by a distance of less than a bee space, for inducing the bees to fill said space with propolis, said sheet having a channel to permit bee passage therethrough, said wall having a channel in registry with said other channel to permit bee passage therethrough, and said device being removable from the hive for clearing it of its accumulated propolis.

6. In combination with a bee hive, a device for propolis obtention mountable within the hive comprising a foraminous sheet, means for retention of said sheet in superposition over a wall in the hive and in separation from said wall by a distance of less than a bee space, for inducing the bees to fill said space with propolis, said sheet having a channel to permit bee passage therethrough, said wall having a channel in registry with said other channel to permit bee passage therethrough, and said device being removable from the hive for clearing it of its accumulated propolis.

LLOYD V. FRANCE.

No references cited.